United States Patent [19]
Nagata et al.

[11] Patent Number: 5,113,214
[45] Date of Patent: May 12, 1992

[54] ZOOM LENS SYSTEM

[75] Inventors: Atsushi Nagata; Atsushi Misawa, both of Tokyo, Japan

[73] Assignee: Fuji Photo Film Co., Ltd., Kanagawa, Japan

[21] Appl. No.: 549,513

[22] Filed: Jul. 6, 1990

[30] Foreign Application Priority Data

Jul. 17, 1989 [JP] Japan .................. 1-184016

[51] Int. Cl.⁵ .................. G03B 5/00; G03B 13/36; H04N 5/232
[52] U.S. Cl. .................. 354/402; 354/195.1; 358/227
[58] Field of Search .................. 354/400, 402, 195.1, 354/195.12; 358/227; 350/429; 359/696–698

[56] References Cited

U.S. PATENT DOCUMENTS

| | | | |
|---|---|---|---|
| 4,083,057 | 4/1978 | Quinn | 354/195.12 X |
| 4,145,732 | 3/1979 | Pandres, Jr. | 350/429 X |
| 4,156,933 | 5/1979 | Pandres, Jr. | 350/429 X |
| 4,825,237 | 4/1989 | Hatase et al. | 354/402 |
| 4,942,417 | 7/1990 | Miyazawa et al. | 354/400 |
| 4,951,075 | 8/1990 | Tokumaru et al. | 354/400 |
| 4,962,400 | 10/1990 | Otani et al. | 354/195.1 |
| 5,027,147 | 6/1991 | Kaneda | 354/400 |

FOREIGN PATENT DOCUMENTS 60-1602 1/1985 Japan
2-167512 6/1990 Japan

Primary Examiner—W. B. Perkey
Attorney, Agent, or Firm—Sughrue, Mion, Zinn, Macpeak & Seas

[57] ABSTRACT

A zoom lens system in which an angle of view is automatically varied according to camera-to-subject distances so as to be able to provide on a photographing screen a subject which is always constant in size. In the zoom lens system, a focus lens is stopped at a given position and, in this condition, a magnification varying lens and a compensator lens are driven to thereby achieve a focusing operation. In this operation, the angle of view is automatically varied according to the camera-to-subject distances, so that the size of the subject can be always constant with respect to the photographing screen regardless of the camera-to-subject distances. As a result of this, according to the invention, there is eliminated the need for provision of a data table memory for performing an automatic zooming operation, and exclusive and complicated control device and position detection device.

3 Claims, 5 Drawing Sheets

WIDE

TELE

ZOOM LENS SYSTEM

BACKGROUND OF THE INVENTION

1. Field of the Invention

The present invention relates to a zoom lens system and, in particular, to such zoom lens system which, in the autozooming mode thereof, is capable of automatically changing an angle of view according to camera-to-subject distances to thereby provide a subject of a constantly given size on a photographing screen.

2. Description of the Related Art

In an ordinary zoom lens system used in a still camera or in a video camera, in order to achieve a zooming operation, part of lenses forming such zoom lens system is moved to thereby vary a focal distance and thus vary an angle of view.

Also, in recent years, there has been proposed an automatic zoom lens system which is capable of automatically varying an angle of view according to camera-to-subject distances to thereby photograph a subject in a constantly given size with respect to a photographing screen. Examples of such automatic zoom lens system are disclosed in Japanese Patent Publication No. 60-1602, Japanese Patent Application Laid-open (Tokkai) No. 60-249478, Japanese Patent Application Laid-open (Tokkai) No.61-10372, Japanese Patent Application Laid-open (Tokkai) No.61-288210 and the like.

However, there are still left problems to be solved in the above-mentioned prior art zoom lens systems. Specifically, in these prior art systems, in order to be able to photograph a subject in a given size regardless of camera-to-subject distances, the distance from a camera to the subject must be first measured by means of distance measuring means, an angle of view is found by operating the thus measured distance and a previously set value of a size which the subject occupies in a screen, and the zoom lens in driven by means of a zoom drive system in accordance with the thus obtained angle of view.

Therefore, in the prior art automatic zoom lens system, there are required a memory for a data table which must be set up previously, a complicated control system exclusively used for the automatic zoom lens system, and means for detecting of positions, which makes the structure of the system complicated.

SUMMARY OF THE INVENTION

The present invention aims at eliminating the drawbacks found in the above-mentioned prior art zoom lens systems.

Accordingly, it is an object of the invention to provide a zoom lens system which is simple in structure, without requiring any memory for a data table or any complicated control system, and also which is capable of obtaining a subject of a constantly given size regardless of camera-to-subjects distance.

In order to attain the above object, according to the invention, there is provided a zoom lens system including a front lens for condensing of light, a magnification varying lens for varying the magnification of an image of a subject to be photographed, a compensator lens, and a focus lens for focusing, the zoom lens system comprising: automatic zoom switching means; AF control means for driving the focus lens to a focusing position in accordance with a distance measurement signal; position restricting means for driving the magnification varying lens and compensator lens along their respective predetermined movement paths; zoom drive means for driving the position control means; and, control means, when the automatic zoom switching means is operated, for fixing the focus lens at a given position, driving the position restricting means through the zoom drive means in accordance with a signal from the AF control means to thereby allow the magnification varying lens and compensator lens to perform a focusing operation and change an angle of view for photographing, and photographing the subject in a given size on a photographing screen according to camera-to-subject distances.

In a zoom lens system according to the invention, if the system is set into an automatic zoom mode by automatic zoom switching means, then control means stops a focus lens at a given position and, in this condition, drives a magnification lens and a compensator lens while keeping their positional relationship by means of position restricting means to thereby perform a focusing operation. In this operation, an angle of view for photographing is automatically varied according to camera-to-subject distances, so that the size of the subject can be constant with respect to a photographing screen regardless of the camera-to-subject distances.

As a result of this, there is eliminated the need for provision of a memory for storage of a data table used to achieve an automatic zooming operation, an exclusively used complicated control system and a position detection means, which are necessary in the prior art zoom lens systems.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a zoom lens system according to the present invention with reference to the accompanying drawings.

Figure 1:
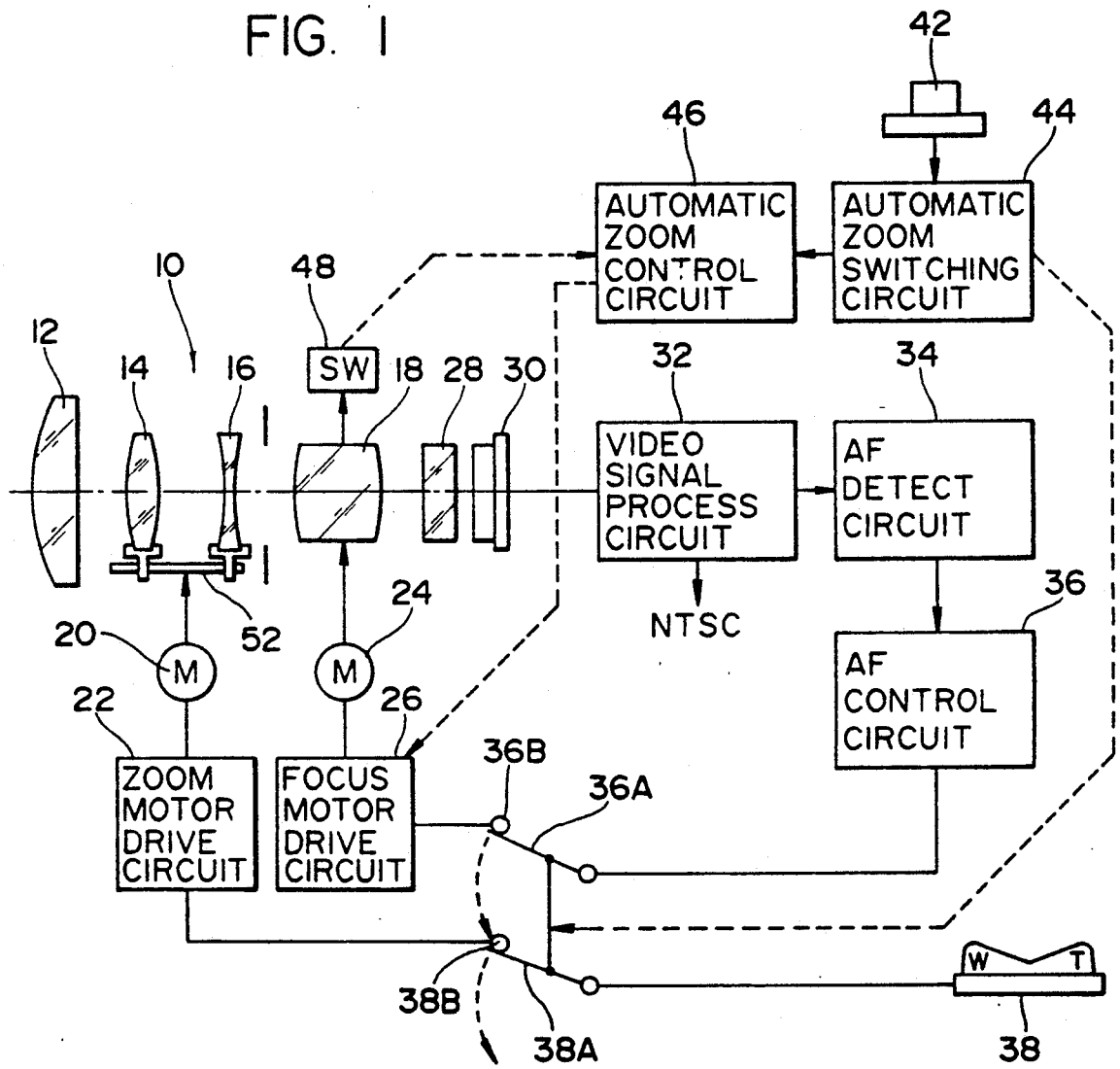
FIG. 1 is a block diagram of a zoom lens system according to the invention.

In FIG. 1, there is shown the whole structure of a camera to which a zoom lens system according to the invention is applied.

The illustrated zoom lens system is composed of a zoom lens 10 of a rear focus type. The zoom lens 10 comprises a front lens group 12 for condensing the light of a subject, a magnification varying lens group 14 for varying the magnification of an image, a compensator lens group 16, and a focus lens group 18 for performing a focusing operation in a normal zoom mode.

The magnification varying lens group 14 and compensator lens group 16 are moved together while they are being kept in a predetermined positional relationship by a cam ring 52 (which will be discussed later) to be driven by a motor 20. The motor 20 is controlled and driven by a zoom motor drive circuit 22. Also, the focus lens group 18 is driven by another motor 24 and this motor 24 is controlled and driven by a focus motor drive circuit 26.

The subject light going out of the focus lens group 18 passes through an optical low-pass filter 28 in which the higher frequency components thereof are cut off therefrom, and after that the image of the subject light is formed in an image pickup part 30. The formed image of the subject light is converted to an electric signal in the image pickup part 30 and after that the electric signal is further converted to an NTSC signal in a video signal process circuit 32.

Another output from the video signal process circuit 32 is transmitted to an AF detect circuit 34 and the detection signal of the AF detect circuit 34 is sent to an AF control circuit 36. The AF control circuit 36 outputs its signal to the above-mentioned focus motor drive circuit 26 through a switch piece member 36A.

The AF detect circuit 34 and AF control circuit 36 cooperates in forming AF control means. For example, in a contrast detect method, the AF control means detects the high frequency components of the video signal to control the focus motor drive circuit 26 by means of so called hill climbing control to thereby move the focus lens group 18 and adjust the focus thereof. The detection method is not always limited to the above-mentioned contrast detect method, but other methods such as a phase difference method, a piezo AF method and the like may be used, provided that a photographing light is employed.

Also, in order to vary the magnification of the subject image, the motor 20 is controlled or driven by the zoom motor drive circuit 22 to rotate a cam ring 52 so as to move the magnification varying lens group 14 and compensator lens group 16. The direction of and quantity of the movement of the magnification varying lens group 14 are determined by means of operation of a tele-wide switch 38. If the wide side of the tele-wide switch 38 is pressed down, then a signal is being sent, while the switch 38 is being depressed, to the zoom motor drive circuit 22 through a switch piece member 38A so that the magnification varying lens group 14 and compensator lens group 16 are drawn to the wide side or forwardly. On the other hand, while the tele side of the switch 38 is being pressed down, another signal is being sent to the zoom motor drive circuit 22 through the switch piece member 38A so that the compensator lens group 16 and magnification varying lens group 14 are pulled in to the tele side or rearwardly.

A mode switching button 42 and an automatic zoom switching circuit 44 cooperate in forming switching means which changes over modes, in particular, from a normal zoom mode to an automatic zoom mode. In operation, the automatic zoom switching circuit 44 switches the switch piece members 36A, 38A to thereby cut off the AF control circuit 36 from connection with the focus motor drive circuit 28 as well as cut off the tele-wide switch 38 from connection with the zoom motor drive circuit 22, so that the AF control circuit 36 can be connected with the zoom motor drive circuit 22 by means of the switch piece member 36A.

Further, the automatic zoom switching circuit 44 sends a signal to the automatic zoom control circuit 46 and the automatic zoom control circuit 46 in turn supplies a signal to the focus motor drive circuit 26 to thereby drive the focus lens group 18. When the focus lens 18 is moved to a predetermined position, then this position is detected by a position sensor 48. At this position, a stop signal is sent from the automatic zoom control circuit 46 to the focus motor drive circuit 26, so that the focus lens 18 can be made to stop at the predetermined position.

Figure 2:
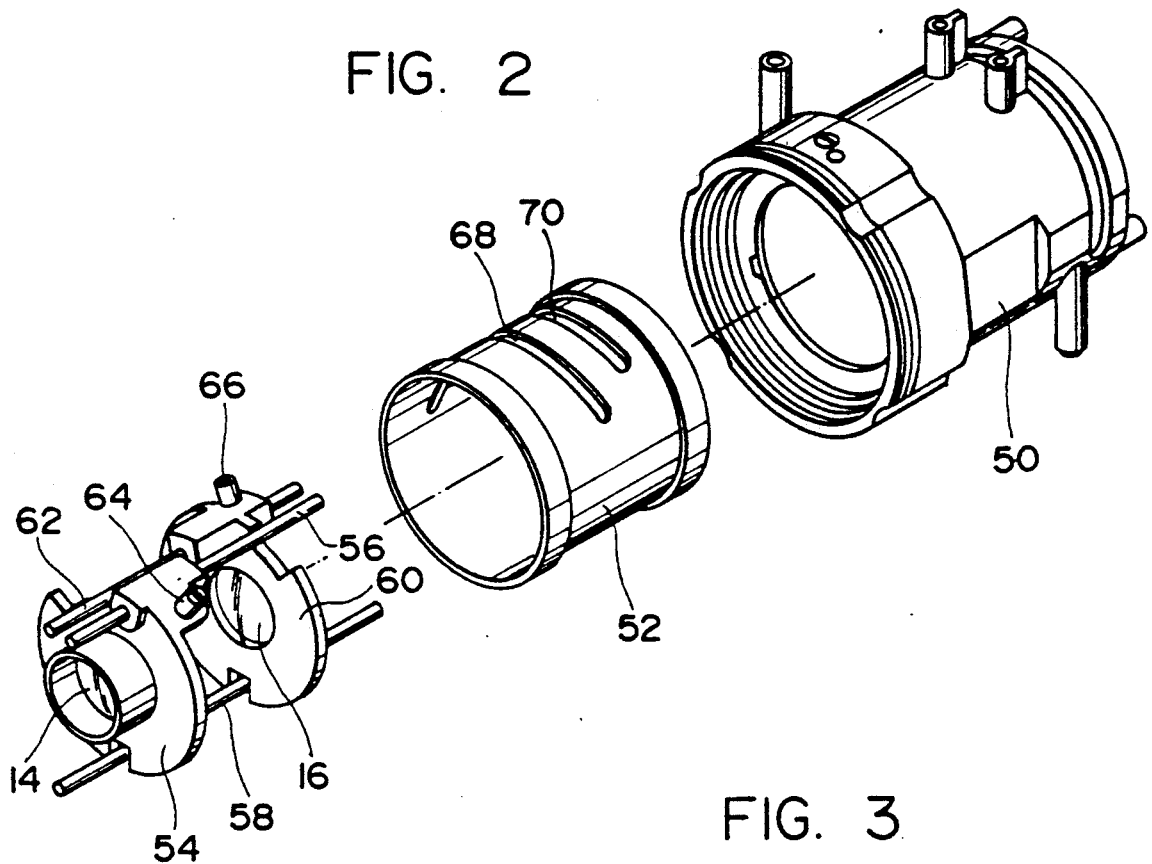
FIG. 2 is a perspective and general view of a cam ring employed in the invention.
Figure 3:
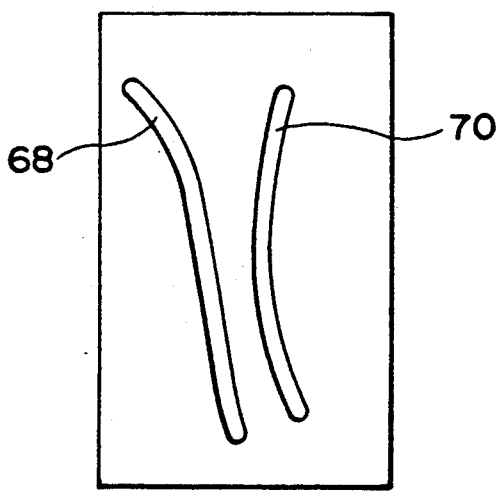
FIG. 3 is a developed view of the cam ring employed in the invention.

In FIG. 2, there is shown an exploded view of a portion of a camera in which the cam ring 52 is disposed. In a main lens barrel 50 there is located the cam ring 52. In the cam ring 52, there are disposed the magnification varying lens group 14 and the compensator lens group 16. The magnification varying lens group 14 is mounted to a lens support frame 54, and the lens support frame 54 is guided in the axial direction of the lens barrel by guide rods 56, 58. Also, the compensator lens group 16 is mounted to a lens support frame 60, and the lens support frame 60 is guided in the axial direction of the lens barrel by guide rods 62, 58. In the lens support frames 54, 60 there are planted follower pins 64, 66, respectively, which are located respectively in cam grooves 66, 70 formed in the cam ring 52. Due to this structure, if the cam ring 52 is rotated by the motor 20, then the magnification varying lens group 14 and compensator lens group 16 are moved while maintaining a predetermined relationship which is restricted by cam grooves 68, 70. The configurations of the cam grooves 68, 70 are shown in FIG. 3 and are determined in the following manner.

That is, at first, the focus lens 18 is fixed at a certain position. In this condition, such points are found that enable the magnification varying lens group 14 and compensator lens group 16 to take such positions as to be able to provide a constant photographing magnification regardless of the variations of photographing view angles of the zoom lens. After that, such points are joined to one another sequentially to thereby find loci respectively for the movements of the magnifications varying lens group 14 and compensator lens group 16. The cam grooves 68, 70 are formed so as to follow the thus found loci. In other words, the cam grooves 68, 70 are shaped such that they can keep such a positional relationship as to bring the zoom lens into focus on a subject which is present near the camera in a wide mode, and also to bring the zoom lens into focus on a subject remote from the camera in a tele mode. Accordingly, the shapes of the cam grooves 68, 70 are determined by following the locus respectively formed by joining points in which the focusing camera-to-subject distance of the magnification varying lens group 14 and compensator lens group 16 and the focal distance of the zoom lens system are substantially proportional to each other. With use of the cam grooves having such shapes, it is possible to realize photographing with a constant magnification by bringing the camera into focus on the subject by means of a zooming operation.

Figure 4:
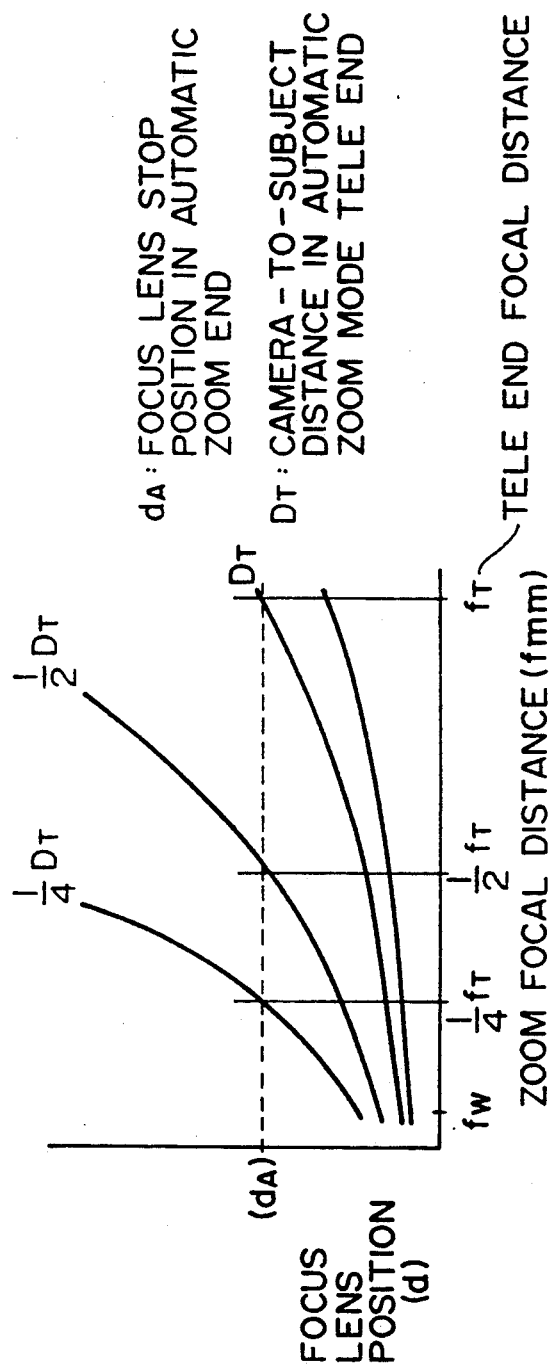
FIG. 4 is a graphical representation of a relationship between the zooming focal distance and the position of a focus lens.

Referring now to FIG. 4, there is shown a graphical representation in which the transverse axis is denoted as the zoom focal distance (f mm) and the ordinate axis is denoted as the focus lens position (d). In this figure, reference character $D_T$ designates a photographing distance at the tele end in the automatic zoom mode, and $d_A$ stands for the focus lens stop position in the automatic zoom mode. As can be seen from FIG. 4, if the focus lens 18 is fixed at a certain position $d_A$, then $D_T$ and $f_t$ (which represents the tele end focal distance) are substantially proportional to each other. This means that, if the focus lens 18 is fixed at the position of $d_A$, then the camera-to-subject distance and the focal distance of the zoom lens system are substantially proportional to each other and, for this reason, if focusing is achieved by use of the magnification varying lens 14 and compensator lens 16, then there can be obtained on the photographing screen such subject that is always constant in size.

Figure 5:
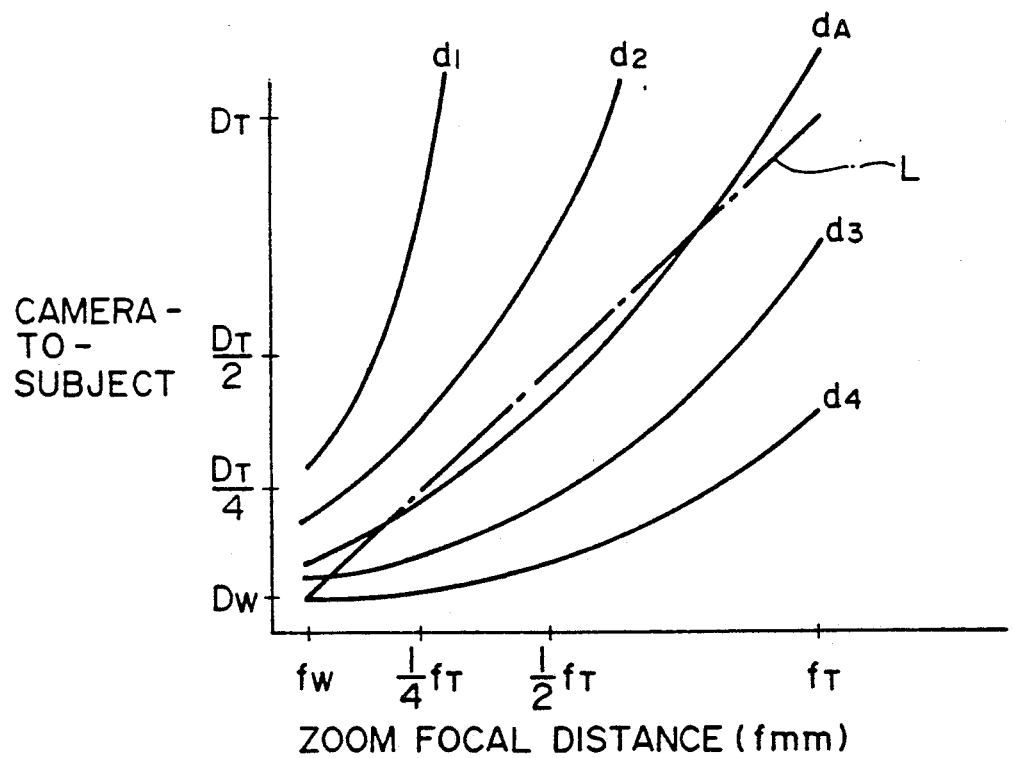
FIG. 5 is a graphical representation of a relationship between the zooming focal distance and the focusing distance of a subject.

Next, in FIG. 5, there is shown a graphical representation which is made up from the characteristic view in FIG. 4 and in which the transverse axis is represented as the zoom focal distance (f mm) and the ordinate axis is represented as the focusing photographing distance $D_T$. In this figure, reference character L designates an ideal straight line (which is a straight line obtained when the magnification is not caused to vary on the photographing screen). From this figure, it can be understood that $d_A$ is approximate to the ideal straight line L. In this figure, reference characters $d_1, d_2, d_3, d_4$ . . . respectively stand for the respective positions of the respective focus lenses in a normal zoom mode. For example, when the camera-to-subject distance $D_T/2$, the zoom focal distance can be found from the curved line of $d_1$.

Now, the cam grooves 68, 70 in the cam ring 52 can be determined by use of FIG. 5 in the following manner:

(1) The zoom area is divided into a plurality of sub-areas, for example 10 sub-areas.

(2) With the front lens 12 and the image forming surface 30 being fixed, the stop position $d_A$ of the focus lens 18 is set at a proper intermediate position (for example, a position at which the compensator lens 16 does not interfere with the focus lens 18 when the compensator lens 16 is moved).

(3) The magnification varying lens 14 is moved to the wide end and then the position of the magnification varying lens 14 at the wide end is determined.

(4) Since the zoom focal distance $f_W$ at the wide end is known in FIG. 5, the focusing camera-to-subject distance can be determined from the ideal straight line (which can provide an image of a constant size). Thus, the compensator lens 16 is disposed such that the camera can be brought into focus on the thus determined focusing camera-to-subject distance.

(The foregoing procedures determine the positions of the magnification varying lens 14 and compensator lens 16 at the wide end.)

(5) The magnification varying lens 14 is moved to the point of the first sub-area.

(6) The focusing camera-to-subject distance is found from FIG. 5 in a similar manner as in (4).

(7) The compensator lens 16 is disposed such that the camera can be brought into focus on the thus found focusing camera-to-subject distance.

(The foregoing procedures determined the positions of the magnification varying lens 14 and compensator lens 16 at the point of the first sub-area).

The above-mentioned operations will be repeated nine times more for the respective sub-divided points until the tele end is reached.

(8) These operations determine ten pairs of points of the magnification varying lens and compensator lens.

(9) The thus determined ten pairs of points are joined to one another to thereby form the cam curved line of the cam ring 52. The cam grooves formed in this manner are the cam grooves 68, 70 shown in FIG. 3.

Next, description will be given below of the operation of the preferred embodiment of a zoom lens system constructed in the above-mentioned manner according to the invention.

Figure 6:
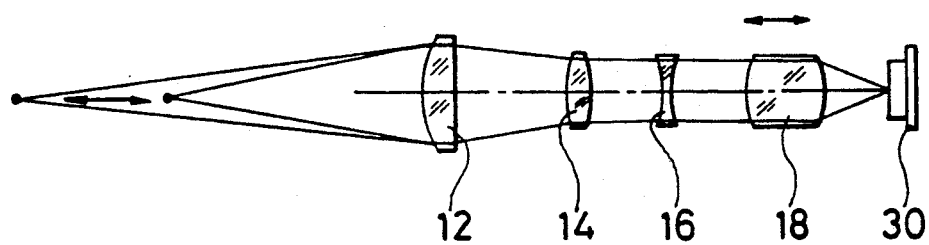
FIG. 6 is an explanatory view of a conventional zoom lens system in an ordinary zoom mode; and, FIG. 7(A) and 7(B) are explanatory views of a zoom lens system in an automatic zoom mode according to the invention.

(1) At first, in a normal zoom photographing, the switch piece members 36A, 38A shown in FIG. 1 are brought into connection with the contacts 36B, 38B, as illustrated in FIG. 1. As result of this, an AF control signal from the AF control circuit 36 is output to the focus motor drive circuit 26. Responsive to this AF control signal, the focus motor drive circuit 26 controls and drives the motor 24 to thereby move the focus lens group 18 for a focusing operation, as shown in FIG. 6.

(2) Also, if the tele-wide switch 38 is put into operation, then the zoom motor drive circuit 22 controls and drives the motor 20 to thereby position the magnification varying lens group 14 and compensator lens group 16 to the tele side or to the wide side. In this operation, de-focusing can be adjusted by means of the above-mentioned operation (1).

(3) Next, if the automatic zoom switching button 42 is pressed down, then the automatic zoom switching circuit 44 is put into operation. As a result of this, the automatic zoom switching circuit 44 outputs a signal to the automatic zoom control circuit 46 and at the same time changes the switch piece member 36A from the contact 36B over to the contact 38B. Responsive to the signal from the zoom switching circuit 44, the automatic zoom control circuit 46 outputs a signal to the focus motor drive circuit 26 to thereby cause the motor 24 to drive the focus lens group 18, and also, when the sensor 48 detects that the focus lens group 18 has arrived at a predetermined position, causes the motor 24 to stop to thereby fix the focus lens group 18 at the predetermined position.

Figure 7A:
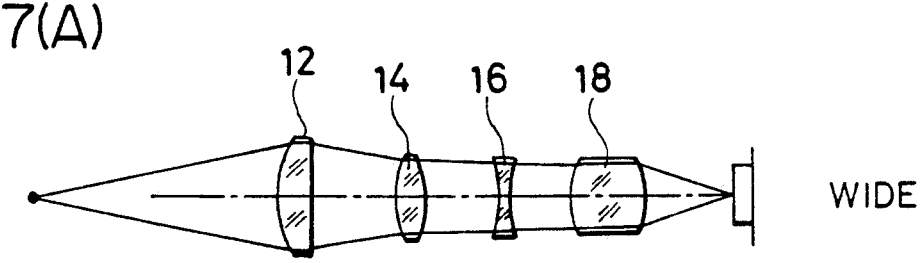
Figure 7B:
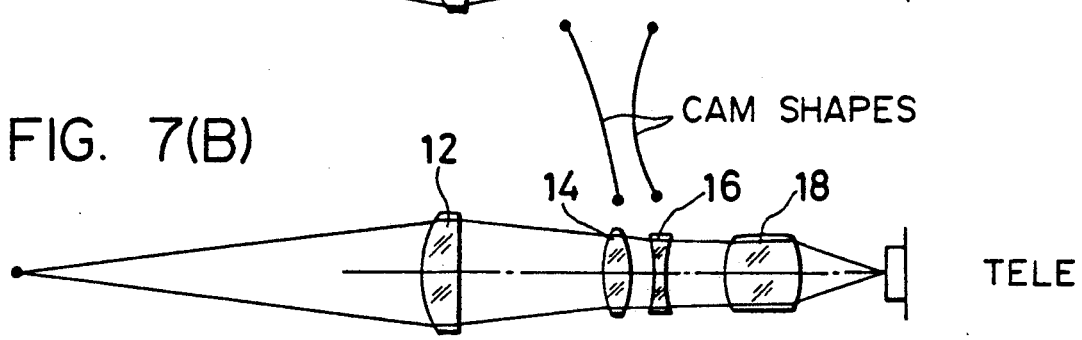

In this state, the zoom motor drive circuit 22 is put into operation in accordance with an output signal from the AF control circuit 36, so that the motor 20 rotates the cam ring 52 to thereby drive the magnification varying lens group 14 and compensator lens group 16. Since at this time the cam ring 52, as described previously, drives the magnification varying lens group 14 and compensator lens group 16 while keeping a predetermined relationship between them, if the lenses 14 and 16 are used to bring the zoom lens system into focus, then there can be naturally obtained a predetermined angle of view for photographing, so that it is possible to provide an image of a subject having a constant size on the photographing screen. Now, in FIGS. 7(A) and (B), there is shown a change from the wide side to the tele side in the automatic zoom mode.

Although the zoom lens system of a rear focus type has been illustrated in the above-mentioned embodiment, it is also possible to apply the present invention to a zoom lens system of a inner focus type.

In the embodiment in FIG. 1, each of the front lens 12, magnification varying lens 14, compensator lens 16 and focus lens 18 is formed of a single lens. However, the present invention is not always limited to this, but each of them can also be formed of a plurality of lenses.

According to a zoom lens system of the present invention, if the automatic zoom mode is set, then the focus lens is fixed at a predetermined position and after then the magnification varying lens and compensator lens are moved in accordance with an AF control signal to thereby achieve a focusing operation and also to automatically change an angle of view for photographing, so that a subject can be photographed in a constant size on a photographing screen.

In other words, according to the present invention, a subject can be photographed in a constant size on a photographing screen by use of a simplified mechanism requiring no memory or the like preset in the prior art systems.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A zoom lens system including one or a plurality of front lenses for condensing of light, one or a plurality of magnification varying lenses for varying the magnification of an image of a subject to be photographed, one or a plurality of compensator lenses, and one or a plurality of focus lenses for focusing, said zoom lens system comprising:

automatic zone switching means for changing operating modes of the zoom lens system;

AF control means for driving said focus lens to a focusing position in accordance with a distance measurement signal;

position restricting means for driving said magnification varying lens and compensator lens along their respective predetermined movement paths;

zoom drive means for said position restricting means; and, control means, when said automatic zoom switching means is operated, for fixing said focus lens at a given position and for driving said position restricting means through said zoom drive means in accordance with a signal sent from said AF control means to thereby allow said magnification varying lens and compensator lens to perform a focusing operation and change an angle of view for photographing, and photographing said subject in a given size on a photographing screen according to camera-to-subject distances.

2. A zoom lens system as set forth in claim 1, wherein said position restricting means comprises at least one cam groove formed in a barrel cam.

3. A zoom lens system as set forth in claim 2, wherein said cam groove formed in said barrel cam is constructed in such a manner that said magnification varying lens and compensator lens are in focus on a subject existing near a camera when said magnification varying lens and compensator lens are located at the wide position thereof and said magnification varying lens and compensator lens are in focus on a subject existing a long distance from the camera when said magnification varying lens and compensator lens are located at the tele position thereof, and also wherein the intermediate portion of said cam groove between the wide and tele position portions thereof is formed so as to follow a locus obtained by connecting points in which a focusing camera to-subject distance and the focal distance of said magnification varying lens and compensator lens are substantially proportional to each other.

* * * * *